(No Model.)
E. CHILDREN.
ATTACHMENT FOR CULTIVATORS.
No. 463,941. Patented Nov. 24, 1891.
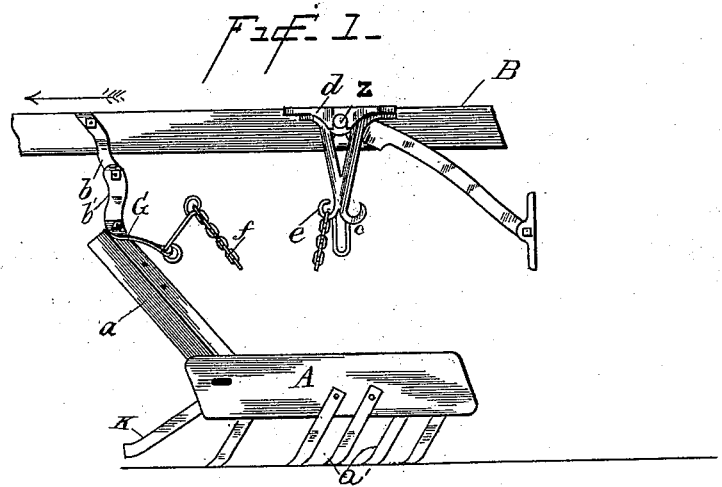
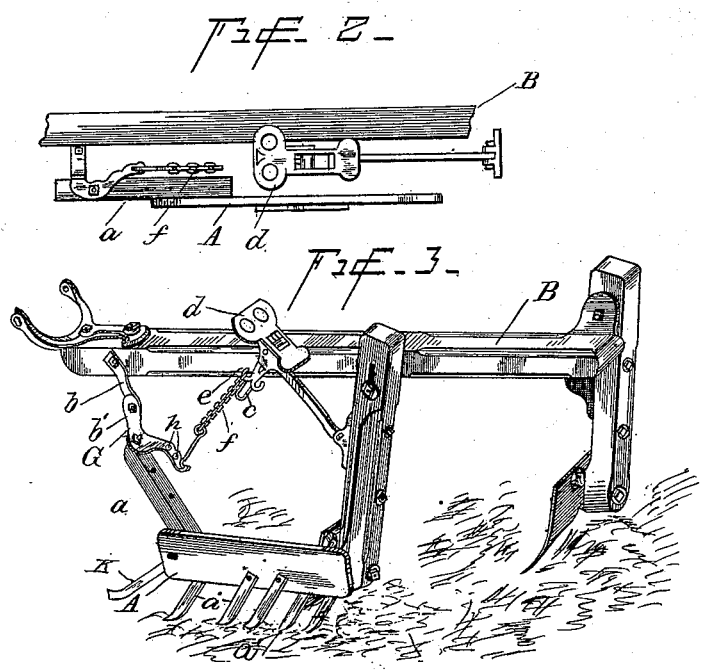
WITNESSES:
Arthur A. Erb.
Leonard H. Dyer.
INVENTOR
Edwin Children
by Frank L. Dyer
Attorney

UNITED STATES PATENT OFFICE.

EDWIN CHILDREN, OF EAST DUBUQUE, ILLINOIS.

ATTACHMENT FOR CULTIVATORS.

SPECIFICATION forming part of Letters Patent No. 463,941, dated November 24, 1891.

Application filed June 28, 1890. Serial No. 357,104. (No model.)

*To all whom it may concern:*

Be it known that I, EDWIN CHILDREN, a citizen of the United States, residing at East Dubuque, in the county of Jo Daviess and State of Illinois, have invented certain new and useful Improvements in Attachments for Cultivators; and I do hereby declare the following to be a full, clear, and exact description of the invention, which will enable others skilled in the art to which it appertains to make and use the same.

This invention has relation to improvements in shields or screens for cultivators; and it consists, principally, in providing means for the more perfect control of such shields by the foot of the operator and also securing more perfect work in the field, and, further, in providing said screens with teeth or knives, whereby a closer and better cultivation of the plant is accomplished, as will more fully hereinafter appear.

Where corn is planted upon land on which corn was raised the preceding year and the old cornstalks are not thoroughly removed, it is not practicable to run the shovels very close to the hills of young corn, as the tearing up of the old stalks frequently injures the young plant, so that in such case the shovels may not be run close enough to get as good cultivation as is desirable. By providing the shields with suitable teeth I am enabled to lightly work the earth close to the plant, and thus hold the young weeds in check until the plant is sufficiently large to have the dirt from the shovels of the cultivator thrown against them and smother the weeds, besides the shields being so thoroughly under the control of the operator that a light working of the soil may be had much closer to the plant than is practical with the usual shovels.

This device would also be of great advantage in the cultivation of other crops, such as beets, sorghum, broom-corn, &c. It is very common that there is much difference in the growth of plants from various causes, and consequently some plants are in condition to receive considerable earth, while others adjacent to them need all the protection that can be given, such as replanting; also the difference between upper and lower sides on side hills, and hence the ability to raise and lower the shields by the foot-pedal comes in play to a great advantage.

There are also a set of conditions provided for in this improvement in certain sections of the country where it is dry and windy, and where the "lister" is in very common use. It will be understood that in this case the plants are in the bottom of the furrow, and often at the time of the second working the wind holds the corn to the sides of the furrow so closely that it may get covered to the injury of the plants, and by carefully adjusting a suitable tooth or finger at the forward end of the screen, so as to carry the leaf or blade of corn forward and upward a protection will thus be provided, while the earth is carried inward toward the stalk of the plant and under the leaf. It will be understood that this tooth, in order to do the best work, should be set a little in advance of the falling earth, all of which will be more fully hereinafter described and shown.

For a better understanding of my invention attention is invited to the accompanying drawings, forming a part of this specification, and in which—

Figure 1 is a side elevation of my invention. Fig. 2 is a plan view, and Fig. 3 is a perspective view.

Like letters indicate identical parts of the invention.

A represents the screen, of any suitable size, shape, or material, pivotally suspended to the cultivator-beam B of any desired cultivator by the arm or support $a$. This supporting-arm $a$ for the screen may be pivotally attached directly to the plow-beam B in the simplest form of my device; but I prefer to bolt it to an auxiliary arm G, secured to one side of the cultivator-beam B. This auxiliary arm I prefer to make in two pieces $b\ b'$. The piece $b$ is rigidly bolted to the plow-beam at its upper end, and to its lower end the piece $b'$ is pivoted, and the piece $b'$ is securely bolted to the arm $a$. This part $b'$ is provided with a series of holes $h\ h$ for the purposes to be shown. The support $a$ is provided with a number of holes therein, so that its relative position may be changed.

Pivoted to the plow-beam B by means of a bolt $z$ is a foot-pedal $d$, placed at a convenient distance from the operator. Rigidly secured to the lower face of the pedal $d$ is an arm $e$, having its lower extremity bent or curved in the form of a double hook $c$. A chain or pitman $f$ connects the hook $c$ of the arm $e$ with the arm $b'$ in such a manner that as the arm $e$ is raised by the pedal $d$ the arm $b'$ and the screen A will be correspondingly elevated. The point of connection of this chain to the support $a$ may be varied, as will readily appear, by changing the attachment in the holes $h\ h$ in the auxiliary arm G.

To the sides of the screen A, I attach the knives or teeth $a'$, preferably to both sides, and have their lower ends point out from the screen, according to the side to which they are attached. They may be made straight and attached to either side. The manner of attaching or in form is unimportant, only so that they will stir the dirt and tear up the weeds near the plants. I also, for windy localities, as before set out, attach the curved tooth K at the front end of said screen, which goes in front and raises up the blade of plant while the dirt is being thrown under and against the stalk, as before described.

From the general construction I have above mentioned, and which, perhaps, is the simplest form of my invention, it will be evident that the following will be the method of operation: The height of the screen is first adjusted with relation to the cut of the cultivator by means of the various adjusting-points before described, and any slack in the chain is taken up by inserting the proper link therein over the hook of the lever $e$, as will be evident. The cultivator is now operated in the usual way, and the screen prevents too much of the earth from rolling against the corn, and also the teeth $a'$ stir up the dirt and cut up the weeds near the young plants. Whenever any other corn is reached which requires more or less dirt by using the foot-pedal the screen is raised and lowered at the will of the operator by his foot, and in this manner he can vary the amount of dirt against the corn, according as the varied conditions of the corn demand. Whenever it is necessary to use the tooth $k$ the shield may or may not have the teeth $a'$; but the management of the screen by the foot of the operator is always the same.

The arrangement I have described and manner of attaching are capable of a great many changes which might be suggested by a good mechanic and which could come within the main spirit of my invention, which consists in providing a cultivator with a foot-controlled screen or shield; also in attaching teeth or knives to the screen of a cultivator, whereby the earth may be stirred closer to the plants and the weeds cut, and, further, in raising the leaf or blade of the plant to enable the earth to pass under it and not cover the same.

Having now described my invention, what I claim as new, and desire to secure by Letters Patent, is—

1. In a cultivator, a screen supplied with a vine or leaf lifting finger, in combination with means for controlling the foot-operated screen attached to the plow-beam, for the purposes set forth.

2. In a cultivator, a screen pivoted thereto and supplied with teeth or knives, in combination with means for raising, lowering, and controlling the same at the will of the operator without disturbing the plow-beams, as shown and described.

3. In a cultivator, a screen or fender pivoted to the beam and having a series of knives projecting below its base and a vine or leaf lifting finger projecting from its front, in combination with means for raising, lowering, and controlling the same while in operation without affecting the plow-beams.

4. The combination, with a cultivator, of a screen or fender pivoted thereto and a foot-pedal and controlling means pivoted to the cultivator-beam, substantially as described, whereby the screen may be raised and lowered at the will of the operator without raising or lowering the cultivator-beam and the earth may be thrown among the plants or kept therefrom, for the purposes set forth.

In testimony whereof I affix my signature in presence of two witnesses.

EDWIN CHILDREN.

Witnesses:
MONROE M. CODY,
J. F. NELSON.